United States Patent

Karube et al.

[11] Patent Number: 5,326,957
[45] Date of Patent: Jul. 5, 1994

[54] APPARATUS FOR AND METHOD OF WELDING SURFACE-TREATED METALLIC WORKPIECES

[75] Inventors: Norio Karube, Machida; Yoshinori Nakata; Atsushi Mori, both of Minamitsuru; Etsuo Yamazaki, Hachioji, all of Japan

[73] Assignee: Fanuc Ltd., Minamitsuru, Japan

[21] Appl. No.: 938,177

[22] PCT Filed: Apr. 21, 1992

[86] PCT No.: PCT/JP92/00517
§ 371 Date: Dec. 4, 1992
§ 102(e) Date: Dec. 4, 1992

[87] PCT Pub. No.: WO92/19412
PCT Pub. Date: Nov. 12, 1992

[51] Int. Cl.[5] .................... B23K 9/167
[52] U.S. Cl. .................... 219/137 WM; 219/74; 219/75
[58] Field of Search ....... 219/74, 75, 137 R, 137 WM

[56] References Cited

U.S. PATENT DOCUMENTS

| | | | |
|---|---|---|---|
| 3,253,113 | 5/1966 | Breymeier | 219/74 |
| 3,692,973 | 9/1972 | Oku et al. | 219/75 |
| 4,904,842 | 2/1990 | Yasuda et al. | 219/137 R |

FOREIGN PATENT DOCUMENTS 57-209778 12/1982 Japan.
1-309796 12/1989 Japan.

*Primary Examiner*—Clifford C. Shaw
*Attorney, Agent, or Firm*—Staas & Halsey

[57] ABSTRACT

Surface-treated metallic workpieces such as zinc-plated steel plates are welded with high quality while they are being held in intimate contact with each other. An auxiliary gas including an oxygen gas is ejected from a space (7) around an electrode (1) through a nozzle (8) to a welding point (9) on overlapping surface-treated metallic workpieces such as zinc-plated steel plates (3a, 3b). When the zinc-plated steel plates (3a, 3b) are welded in the atmosphere of the auxiliary gas, the surface layers of zinc and oxygen react with each other, producing a solid oxide such as zinc oxide or zinc peroxide. Therefore, a gas such as a zinc vapor is prevented from being produced between the overlapping zinc-plated steel plates (3a, 3b). The welded joint is of high quality without blowholes which would otherwise blow away molten steel.

4 Claims, 6 Drawing Sheets

APPARATUS FOR AND METHOD OF WELDING SURFACE-TREATED METALLIC WORKPIECES

TECHNICAL FIELD

The present invention relates to an apparatus for and a method of welding surface-treated metallic workpieces, and more particularly to an apparatus for and a method of welding zinc-plated steel plates according to a gas-shielded arc welding or plasma welding process.

BACKGROUND ART

Welding technology for welding overlapping steel plates is finding wide use primarily in the automobile industry. Steel plates used in the automobile are plated with zinc layers for corrosion resistance. Welding apparatuses for welding such zinc-plated steel plates include gas-shielded arc welding and plasma welding apparatuses.

In such a gas-shielded arc welding and plasma welding apparatus, an inert gas is ejected from around an electrode toward a molten pool on a base material, so that the base material is welded in a given gas atmosphere, or an arc column is constricted to obtain a high temperature.

When overlapping zinc-plated steel plates are welded, plated-zinc surface layers sandwiched between the steel plates are evaporated into a zinc gas because the plated zinc layers have a lower melting temperature than the steel plates. The zinc gas is highly pressurized as there is no space it can escape into. When the steel plates are then heated, they are melted, and the zinc gas under high pressure is released into the atmosphere, forcing aside the molten steel. Therefore, the welded joint contains blowholes as marks indicative of the release of the zinc gas, resulting in a reduction in the welding quality.

To avoid the above drawback, it has been customary in the welding of overlapping zinc-plated steel plates to space the zinc-plated steel plates from each other with a clearance therebetween, and a zinc vapor generated from plated-zinc surface layers sandwiched between the steel plates is allowed to escape through the clearance. It is necessary for such a clearance to be as small as possible from the standpoint of a good welding process. The clearance is created by placing a sheet between the steel plates or applying a coating material to the steel plates.

Controlling the clearance between the steel plates in an actual production site has required an extra procedure. Therefore, there has been a demand for a method of welding zinc-plated steel plates while they are being held in intimate contact with each other without any clearance therebetween.

DISCLOSURE OF THE INVENTION

In view of the aforesaid difficulties of the conventional welding apparatus, it is an object of the present invention to provide an apparatus for and a method of welding surface-treated metallic workpieces such as zinc-plated steel plates with high welding quality while they are being held in intimate contact with each other.

To achieve the above object, there is provided in accordance with the present invention an apparatus for welding surface-treated metallic workpieces that are composed of a base material coated with a material whose evaporation temperature is lower than the melting temperature of the base material, according to a gas-shielded arc welding or plasma welding process, the apparatus comprising supply means for supplying an auxiliary gas composed of an oxygen gas and other gases, and ejecting means for ejecting the auxiliary gas to a welding point on the surface-treated metallic workpieces.

According to the present invention, there is also provided a method of welding surface-treated metallic workpieces that are composed of a base material coated with a material whose evaporation temperature is lower than the melting temperature of the base material, according to a gas-shielded arc welding or plasma welding process, the method comprising the step of supplying an auxiliary gas composed of an oxygen gas and other gases to a welding point on the surface-treated metallic workpieces.

When the surface-treated metallic workpieces, such as zinc-plated steel plates, are welded in the atmosphere of the auxiliary gas which is ejected from the ejecting means, surface layers of zinc and oxygen react with each other, producing a solid oxide such as zinc oxide or zinc peroxide. Therefore, a gas such as a zinc vapor is prevented from being produced. The welded joint is of high quality without blowholes which would otherwise blow away molten steel.

BEST MODE FOR CARRYING OUT THE INVENTION

An embodiment of the present invention will hereinafter be described with reference to the drawings.

Figure 1:
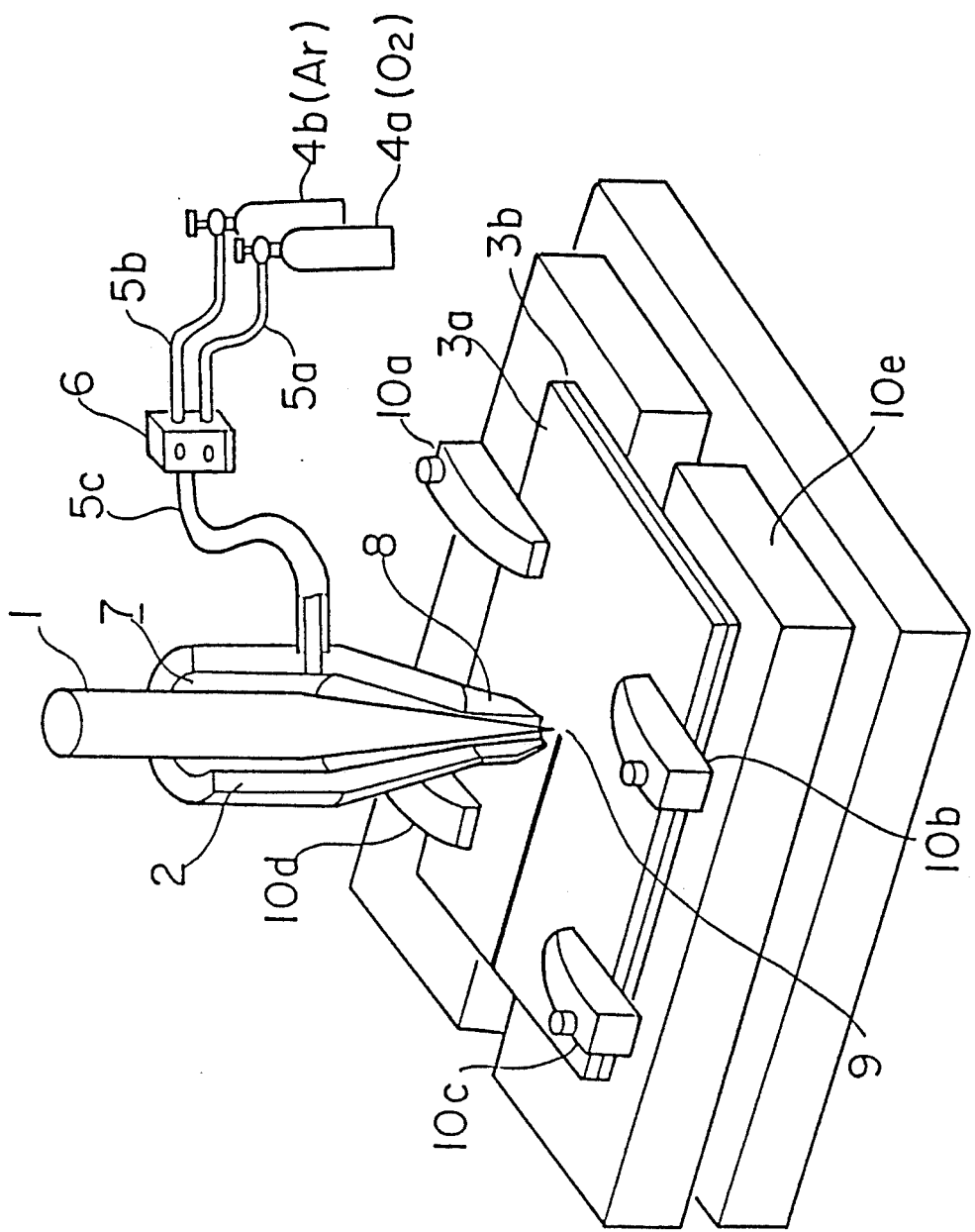
FIG. 1 is a perspective view of a gas-shielded arc welding apparatus according to an embodiment of the present invention.

FIG. 1 shows, in perspective, a gas-shielded arc welding apparatus according to an embodiment of the present invention. The arc welding apparatus includes an electrode 1 supported by a welding head 2 and a nozzle 8 in confronting relationship to zinc-plated steel plates 3a, 3b. The electrode 1 and the zinc-plated steel plates 3a, 3b are electrically connected to a welding power supply (not shown). The welding head 2, the nozzle 8, and the electrode 1 are arranged such that there is a substantially cylindrical space 7 defined therebetween for passage of an auxiliary gas (described later) therethrough. The zinc-plated steel plates 3a, 3b are fixedly mounted on a table 10e by clamps 10a, 10b, 10c, 10d. The welding head 2 and the nozzle 8 with the electrode 1 supported thereby are movable over the upper surface of the table 10e parallel thereto along the zinc-plated steel plates 3a, 3b by an actuator (not shown).

An oxygen ($O_2$) gas is supplied from an oxygen gas container 4a through a hose 5a, and an argon (Ar) gas is supplied from an argon gas container 4b through a hose 5b. The supplied oxygen and argon gases are mixed by a mixer 6, and the mixed gas is supplied from the mixer 6 through a hose 5c into the space 7 in the welding head 2. The gas is then is ejected from the nozzle 8 toward a welding point 9 on the zinc-plated steel plates 3a, 3b. The gas thus ejected toward the welding point 9 is referred to as an auxiliary gas or a shielding gas. Heretofore, an inert gas has been used as such a gas.

In a welding process, at the same time that the welding point 9 on the zinc-plated steel plates 3a, 3b is heated, the auxiliary gas is supplied to the welding point 9. The oxygen gas is combined with zinc, producing zinc oxide and zinc peroxide. Since these compounds are solid, they prevent zinc from being evaporated and also prevent blowholes from being formed. The heat generated when the oxygen gas is combined with zinc is contributes to the welding process.

The zinc-plated steel plates 3a, 3b have a thickness of 0.9 mm each, and are fed with respect to the welding head 2 at a speed of 1.5 m/min. The oxygen gas and the argon gas are mixed at a ratio of 5:1, and the auxiliary gas is supplied at a rate of 20 L/min.

In the above embodiment, the present invention is applied to a gas-shielded arc welding process. The principles of the invention are also applicable to a plasma welding process. In the plasma welding process, an operating gas for constricting an arc column may include an oxygen gas, or a shielding gas may include an oxygen gas.

Figure 2:
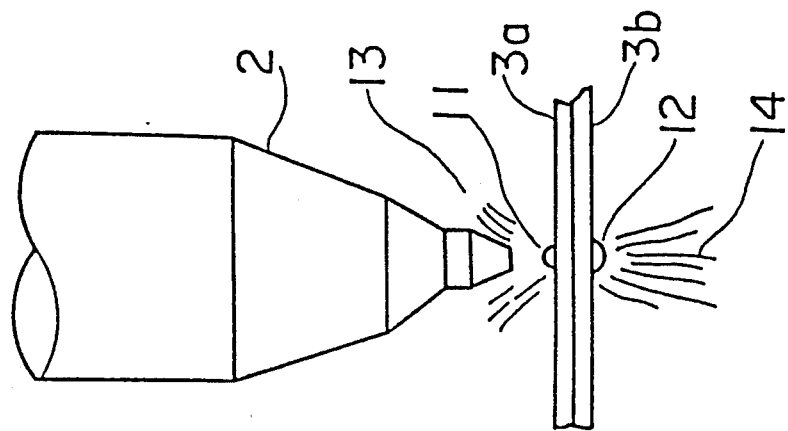
FIG. 2(A) is a side elevational view of a welding head of the gas-shielded arc welding apparatus, showing the manner in which workpieces are welded by the gas-shielded arc welding apparatus using an auxiliary gas including an oxygen gas.
FIG. 2(B) is a front elevational view of the welding head, also showing the manner in which workpieces are welded by the gas-shielded arc welding apparatus using an auxiliary gas including an oxygen gas.
Figure 2:
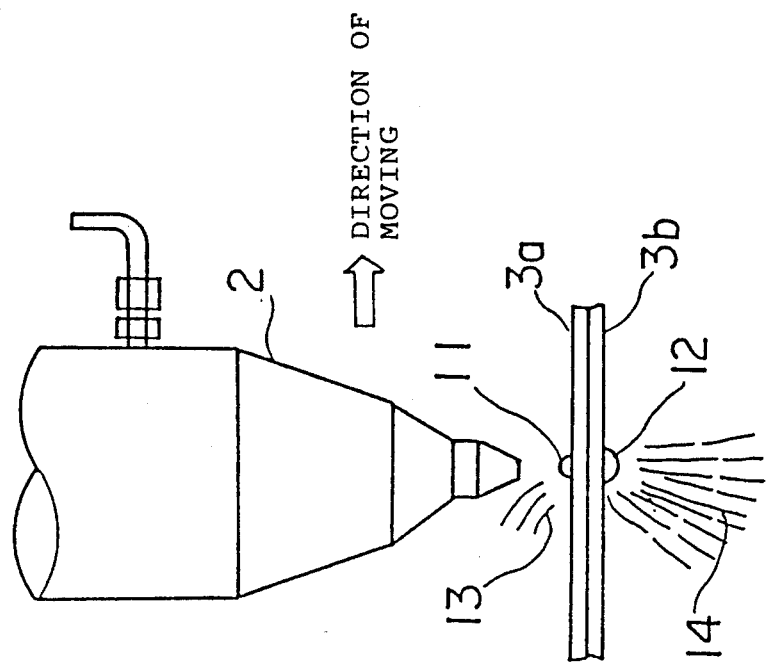

FIGS. 2(A) and 2(B) are a side and a front elevational view of the welding head, respectively, and show the manner in which the zinc-plated steel plates 3a, 3b are welded by the gas-shielded arc welding apparatus using an auxiliary gas including an oxygen gas. As shown in FIGS. 2(A) and 2(B), the zinc-plated steel plates 3a, 3b are welded, fumes 11, 12 of evaporated and ionized gas are generated upwardly and downwardly of the zinc-plated steel plates 3a, 3b, respectively. Furthermore, spatters 13, 14 of expelled molten metal particles are also produced upwardly and downwardly of the zinc-plated steel plates 3a, 3b, respectively. These fumes 11, 12 and spatters 13, 14 are however generated in relatively small amounts.

Figure 3:
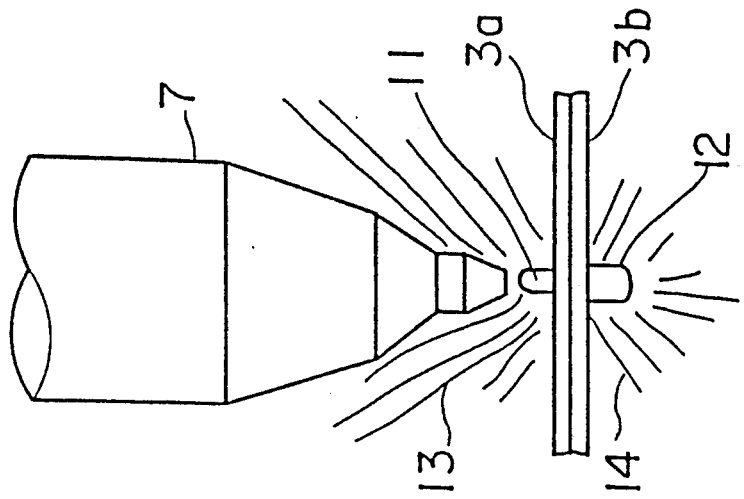
FIG. 3(A) is a side elevational view of the welding head of the gas-shielded arc welding apparatus, showing the condition of surfaces of the workpieces which are welded without use of an auxiliary gas including an oxygen gas.
FIG. 3(B) is a front elevational view of the welding head, also showing the condition of surfaces of the workpieces which are welded without use of an auxiliary gas including an oxygen gas.
Figure 3:
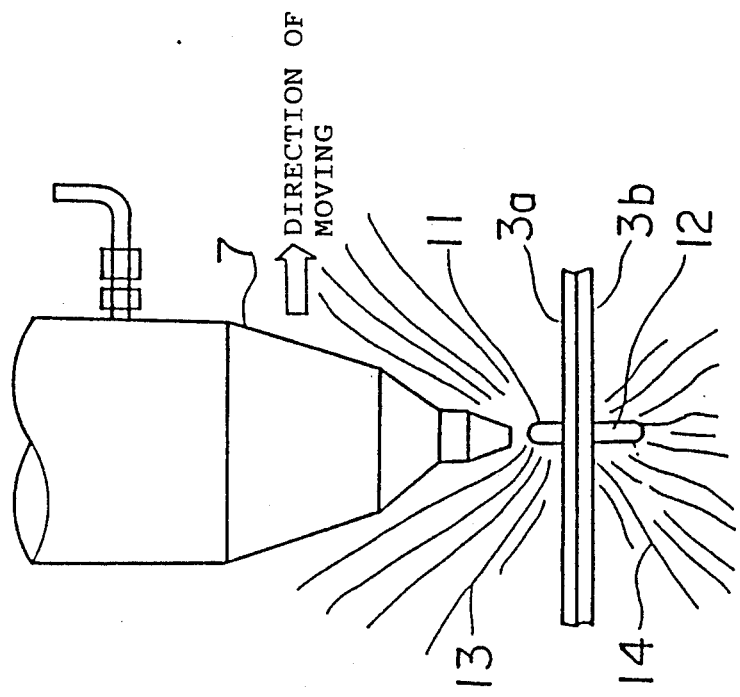

FIGS. 3(A) and 3(B) are a side and a front elevational view of the welding head, respectively, and show the condition of surfaces of zinc-plated steel plates which are welded without the use of an auxiliary gas including an oxygen gas. As shown in FIGS. 3(A) and 3(B), considerable amounts of fumes 11, 12 are generated upwardly and downwardly of the zinc-plated steel plates 3a, 3b, respectively, and considerable amounts of spatters 13, 14 are also produced upwardly and downwardly of the zinc-plated steel plates 3a, 3b, respectively.

A study of FIGS. 2(A), 2(B), 3(A), and 3(B) indicates that the oxygen gas included in the auxiliary gas is effective to reduce the evaporation of zinc and the generation of spatter.

Figure 4:
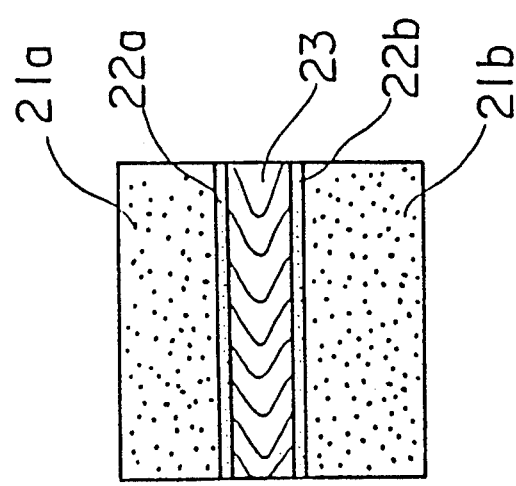
FIG. 4(A) is a fragmentary view of a reverse surface of a welded joint which is produced using an auxiliary gas including an oxygen gas.
FIG. 4(B) is a fragmentary view of an upper surface of the welded joint using an auxiliary gas including an oxygen gas.
Figure 4:
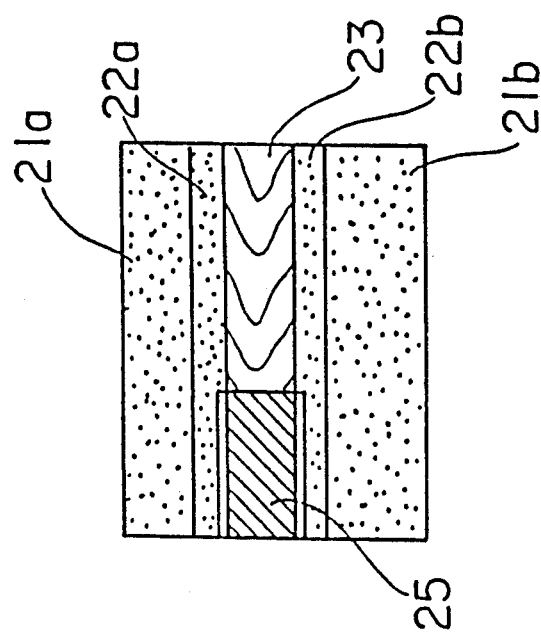

FIGS. 4(A) and 4(B) show reverse and upper surfaces, respectively, of a welded joint which is produced using an auxiliary gas including an oxygen gas. As shown in FIGS. 4(A) and 4(B), darker strips 22a, 22b and brighter strips 21a, 21b of yellow particles which are considered to be of zinc oxide appear on both sides of a weld bead 23. The weld bead 23 includes a slag 25 in a portion thereof, but has substantially no blowholes.

Figure 5:
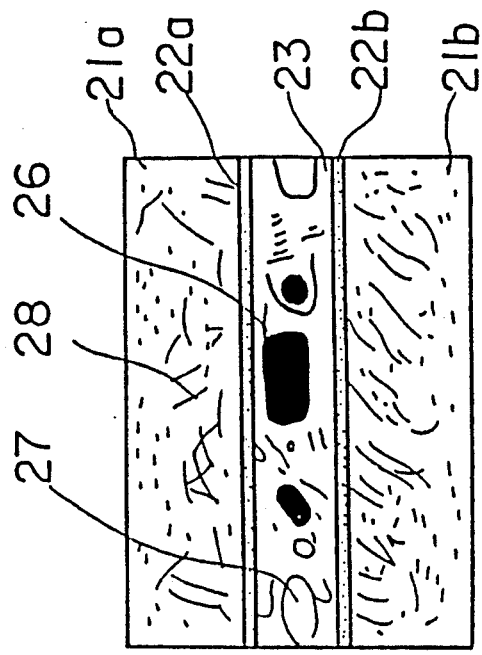
FIG. 5(A) is a fragmentary view of a reverse surface of a welded joint which is produced without use of an auxiliary gas including an oxygen gas.
FIG. 5(B) is a fragmentary view of an upper surface of the welded joint which is produced without use of an auxiliary gas including an oxygen gas.
Figure 5:
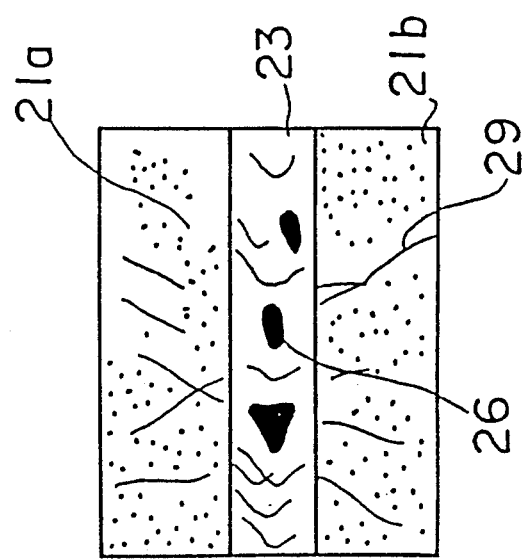

FIGS. 5(A) and 5(B) show reverse and upper surfaces, respectively, of a welded joint which is produced without use of an auxiliary gas including an oxygen gas. As shown in FIGS. 5(A) and 5(B), darker strips 22a, 22b and brighter strips 21a, 21b of yellow particles are formed slightly on both sides of a weld bead 23. It can be observed that the weld bead 23 has regions 26 where blowholes were about, but failed, to develop, and many blowholes 27. Black powdery particles 28 of zinc and carbides are formed, and many traces of spatter 29 are also recognized.

It can be understood from FIGS. 4(A), 4(B), 5(A), and 5(B) that when an auxiliary gas which is a mixture of oxygen and argon gases is used, almost no blowholes are formed, resulting in a high-quality welded joint.

The proportion of the oxygen gas should be larger for better results as the welding rate, i.e., the speed at which the welding head moves, is higher. It is necessary that the proportion of the oxygen gas be greater as the thickness of the plated-zinc layered increased is larger. The same results can be obtained when a helium gas, a nitrogen gas, a carbon-dioxide gas, or their mixture is used instead of the argon gas. Inasmuch as the plated-zinc layer of each of the zinc-plated steel plates is relatively thin, the welding process according to the present invention is essentially free of the problem of a reduction in the welding strength which would otherwise be caused by slag produced due to the use of oxygen.

Figure 6:
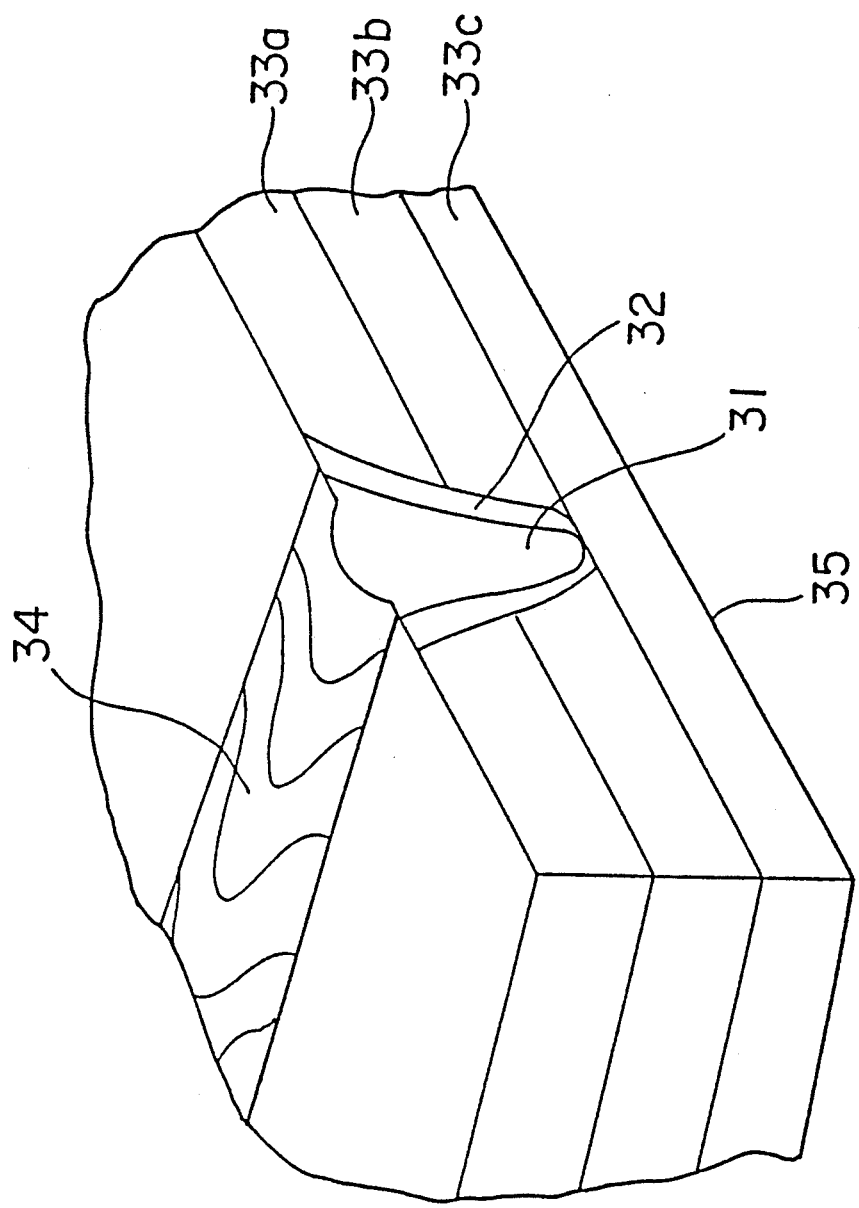
FIG. 6 is an enlarged fragmentary perspective view of three overlapping zinc-plated steel plates that are welded together.

FIG. 6 shows three overlapping zinc-plated steel plates that are welded together. In FIG. 6, zinc-plated steel plates 33a, 33b, 33c are stacked, and only the zinc-plated steel plates 33a, 33b are melted to form a weld bead 34. A thermally affected region 32 is formed outside of a molten region 31. The welding output power of a welding apparatus used and its welding rate are regulated so as not to cause the molten region 31 to thermally affect the zinc-plated steel plate 33c. This welding process is effective in welding workpieces where the zinc-plated steel plate 33c should not be thermally affected and workpiece surfaces should not be affected by the welding process.

In the above embodiment, workpieces which are welded have been described as being zinc-plated steel plates by way of example. The principles of the present invention are also applicable to welding of other surface-treated metallic workpieces which comprise a base material coated with a material whose melting temperature or evaporating temperature is lower than the melting temperature of the base material.

In the above embodiment, an oxygen gas and other gases are mixed and supplied to the welding head 2 by the mixer 6. However, an oxygen gas and another gas may be separately supplied to the tip end of the nozzle 8, so that they may be directly ejected to a welding point. Such a modified process can achieve the same results as those described in the above embodiment.

With the present invention, as described above, an auxiliary gas used in welding overlapping surface-treated metallic workpieces includes an oxygen gas. Therefore, it is possible to produce a high-quality welded joint free of blowholes without having to provide a clearance between the surface-treated metallic workpieces.

We claim:

1. A method of welding surface-treated metallic workpieces each comprising a base material coated with a material whose evaporation temperature is lower than the melting temperature of the base material, according to one of a gas-shielded arc welding and a plasma welding process, said method comprising the steps of:

supplying an auxiliary gas comprising an oxygen gas and at least one other gas to a welding point on the surface-treated metallic workpieces; and increasing a proportion of the oxygen gas in said auxiliary gas higher as a rate at which the surface-treated metallic workpieces are welded is increased.

2. A method according to claim 1, further comprising the steps of: overlapping three of the surface-treated metallic workpieces; and welding the surface-treated metallic workpieces downwardly such that a lowest one of the three surface-treated metallic workpieces will not be melted.

3. A method of welding surface-treated metallic workpieces each comprising a base material coated with a plated layer of material whose evaporation temperature is lower than the melting temperature of the base material, according to one of a gas-shielded arc welding and a plasma welding process, said method comprising the step of:

supplying an auxiliary gas comprising an oxygen gas and at least one other gas to a welding point on the surface-treated metallic workpieces; and increasing a proportion of the oxygen gas in said auxiliary gas higher as a thickness of the plated layers is increased.

4. A method according to claim 3, further comprising the steps of:

overlapping three of the surface-treated metallic workpieces; and welding the surface-treated metallic workpieces downwardly such that the lowest one of the three surface-treated metallic workpieces will not be melted.

* * * * *